United States Patent [19]

Zimmerman et al.

[11] Patent Number: 4,798,852

[45] Date of Patent: Jan. 17, 1989

[54] ULTRAVIOLET CURABLE COATINGS FOR OPTICAL GLASS FIBER

[75] Inventors: John M. Zimmerman, Des Plaines; Timothy E. Bishop, Algonquin, both of Ill.

[73] Assignee: DeSoto, Inc., Des Plaines, Ill.

[21] Appl. No.: 7,456

[22] Filed: Jan. 28, 1987

Related U.S. Application Data

[63] Continuation-in-part of Ser. No. 792,465, Oct. 29, 1985, abandoned.

[51] Int. Cl.$^4$ .......................... C08F 2/50; C08F 20/36; G02B 6/16; G02B 6/22
[52] U.S. Cl. ........................................ 522/96; 522/97; 526/301; 350/96.29; 350/96.33
[58] Field of Search .................... 522/97, 96; 526/301; 350/96.29, 96.33

[56] References Cited

U.S. PATENT DOCUMENTS

| | | | |
|---|---|---|---|
| 3,891,523 | 6/1975 | Hisamatsu | 525/455 |
| 4,082,634 | 4/1978 | Chang | 522/96 |
| 4,107,229 | 8/1978 | Tideswell | 525/507 |
| 4,228,232 | 10/1980 | Rousseau | 522/96 |
| 4,374,963 | 2/1983 | Morgan | 525/922 |
| 4,439,576 | 3/1984 | O'Connor | 525/920 |
| 4,439,577 | 3/1984 | O'Connor | 525/920 |
| 4,458,007 | 7/1984 | Geissler | 528/75 |
| 4,463,158 | 7/1984 | O'Connor | 528/75 |
| 4,485,229 | 11/1984 | Waddill | 528/111 |
| 4,495,271 | 1/1985 | Geissler | 430/277 |

*Primary Examiner*—Allan M. Lieberman
*Assistant Examiner*—A. H. Koeckert

*Attorney, Agent, or Firm*—Dressler, Goldsmith, Shore, Sutker & Milnamow, Ltd.

[57] ABSTRACT

Radiation-curing oligomers and liquid coating compositions based thereon are disclosed which cure with ultraviolet light in the presence of a photoinitiator. The coating compositions can provide either a single coating for optical glass fiber which resists microbending difficulties down to around −40° C., or a topcoat for overcoating softer buffer coatings which resist microbending down to around −60° C. The coating compositions consist essentially of a polyacrylate-terminated oligomer which contains a plurality of urethane and/or urea groups and which is formed from components including: (1) hydroxyl or amine functional polymer having a molecular weight of from about 300 to about 4000 and a functionality of 3 or 4, or a mixture thereof; (2) hydroxyl or amine functional polymer having a molecular weight of from about 200 to about 4000 and a functionality of two; (3) a monohydric acrylate; and (4) organic diisocyanate in an amount sufficient to react with all of the reactive groups in components (1), (2) and (3). The monohydric acrylate is used in an amount to react with all of the reactive groups on component (1) less from 10% to 80% of the last reactive group thereon, and component (2) is used in an amount corresponding to the deficiency of monohydric acrylate. The polyacrylate-terminated oligomer is used in admixture with an ultraviolet curable liquid acrylate or polyacrylate to provide the liquidity needed for application and to adjust the hardness or softness of the cured coating for the selected single coat or topcoat utility, but solvent can be used in electron beam-curing compositions.

28 Claims, No Drawings

ULTRAVIOLET CURABLE COATINGS FOR OPTICAL GLASS FIBER

This application is a continuation-in-part of our prior application Ser. No. 792,465 filed Oct. 29, 1985, now abandoned.

TECHNICAL FIELD

This invention relates to ultraviolet curable coating compositions based on oligomers which have more than two terminal ethylenically unsaturated branches, the usual unsaturation being acrylate unsaturation, which increase toughness and speed the ultraviolet cure, and includes the new radiation-curable oligomers. These compositions may be employed as a single coating applied directly to the optical fiber, or as an overcoating on buffer coated optical fiber to improve the physical properties of the coated fiber, or the new oligomers may be used in electron beam coating compositions.

BACKGROUND ART

Optical glass fiber must be coated to protect its surface against abrasion. Since heat-cured coatings are slow curing, it has been desired to employ ultraviolet-curing coating compositions. This proved to be difficult in practice because the optical fiber must be expected to encounter a wide range of service temperatures, including very low service temperatures. The usual ultraviolet-cured coatings are either too hard initially, or become too hard at the lower service temperatures. This excessive hardness causes the difference between the thermal coefficient of expansion of the coating and the thermal coefficient of expansion of the glass to produce microbends in the fiber when low service temperatures are encountered. These microbends interfere with the capacity of the fiber to convey optical messages.

Industry experienced great difficulty in providing ultraviolet curing coatings which would have enough strength at room or expected elevated service temperature to protect the glass surface against mechanical stress without inducing microbending difficulties at low service temperature until R. E. Ansel, in Ser. No. 170,148 filed July 18, 1980, now U.S. Pat. No. 4,624,994, found that certain urethane oligomer diacrylates could be combined with appropriate mixtures of monoethylenically unsaturated monomers including a large proportion of a monomer of low glass transition temperature to provide a primer or buffer coating which could be overcoated with a stronger and harder topcoat to provide the combination of properties which was needed.

Unfortunately, the coatings disclosed in the aforesaid Ansel application are only able to resist temperatures down to around −40° C., and they require overcoating. While other ultraviolet-cured coatings having better low temperature properties have been found, these are softer at room temperature, and thus more in need of overcoating.

Accordingly, one objective of this invention is to provide ultraviolet-curable coatings which combine reasonably good low temperature microbending resistance with sufficient room temperature strength to be useful in the absence of topcoating.

Optical fibers not only encounter low service temperatures, but they also encounter elevated service temperatures. Those coatings which provide good low temperature characteristics are frequently much too soft at room or elevated service temperature, and thus must be topcoated. It has therefore been found desirable to topcoat a buffer coated optical glass fiber with a tough and flexible overcoat possessing superior resistance to moisture and abrasion. To obtain the desired properties in optical glass fibers which have been buffer coated, resort has been had to the use of extruded Nylon "jacket" coatings, but these are more expensive and difficult to apply than ultraviolet-cured coatings.

It is also known to apply both the buffer coating and the topcoating at high speed using an ultraviolet-curable topcoat on top of a buffer coating which has been ultraviolet cured, but the ultraviolet-cured topcoats have not possessed the desired strength and resistance to rupture without being inadequately flexible.

Another objective of this invention is to provide ultraviolet-curable topcoatings which will substantially duplicate the properties now obtained using the extruded "jacket" coatings noted above so that high speed coating procedures can be used to economically produce buffer coated and topcoated optical glass fiber which will satisfy the demanding commercial requirements which are insisted upon.

Still another objective of this invention is to provide radiation-curable oligomers which can be used for coating optical glass fibers, as discussed above, or which can be cured with electron beam radiation to form coatings having a favorable combination of high strength and good elongation.

DISCLOSURE OF INVENTION

In accordance with this invention, an ultraviolet curing liquid coating composition is provided which, when cured with ultraviolet light in the presence of a photoinitiator, provides a single coating for optical glass fiber having adequate strength at room or expected elevated temperature (and is stable at such elevated temperature) and which can resist microbending difficulties down to around −40° C., or which can be used to overcoat softer buffer coatings which can remain soft to resist microbending difficulties down to around −60° C. This coating composition consists essentially of a polyacrylate-terminated oligomer which contains a plurality of urethane and/or urea groups and which is formed from components which include: (1) hydroxyl or amine functional polymer having a molecular weight of from about 300 to about 4000 and a functionality of 3 or 4, or a mixture thereof; (2) hydroxyl or amine difunctional polymer having a molecular weight of from about 200 to about 4000; (3) a monohydric acrylate; and (4) organic diisocyanate in an amount sufficient to react with all of the reactive groups in components (1), (2) and (3). The monohydric acrylate is used in an amount to react with all of the reactive groups on component (1) less from 10% to 80%, preferably from 20% to 70%, of the last reactive group thereon, and component (2) is used in an amount corresponding to the above defined deficiency of the monohydric acrylate. The diisocyanate bonding the polymer components (1) and (2) provide an oligomer having more than two hydroxy or amine terminated branches which are capped with the monohydric acrylate via said diisocyanate. The polyacrylate-terminated oligomer is used in admixture with an ultraviolet curable liquid acrylate or polyacrylate to provide the liquidity needed for application and to adjust the hardness or softness of the cured coating for the selected single coat or topcoat utility.

To illustrate the deficiency of monohydric acrylate using a trifunctional polymer, the monohydric acrylate is used in an amount of from 2.2 to 2.9 moles per mole of the trihydric polymer. If the at least trifunctional polymer is tetrahydric, the monohydric acrylate is used in an amount of from 3.2 to 3.9 moles per mole of the tetrahydric polymer.

Starting with the at least trifunctional polymer, the monohydric acrylate will be carried by all but one of the reactive groups on most of the molecules thereof (via a diisocyanate linking compound), and the unreacted reactive groups will be on two different molecules will be joined together by the difunctional polymer (via the diisocyanate linking compound. The result is increased oligomer complexity and an average of more than two acrylate groups per oligomer molecule.

This combination of increased oligomeric complexity and more terminal acrylate groups increases the hardness and strength of the cured coating, and it also considerably speeds the cure which is a vital aspect of the practical coating of optical glass fiber.

To more particularly define the products which are illustrative of best practice in accordance with this invention, the proportion of monohydric monoacrylate used in combination with the proportion of the other components provides a molar ratio of the component having a functionality of 3 or 4 to the difunctional component (2) of from 2:1 to 8:1 and a ratio of total hydroxyl and amine equivalents to mols of monohydric acrylate of from 3:1 to 1:1. More preferably, the molar ratio of the component having a functionality of 3 or 4 to the difunctional component (2) triol or tetrol to diol is from 2.5:1 to 6:1 and a ratio of total hydroxyl and amine equivalents to mols of monohydric acrylate of from 2.8:1 to 2.0:1. It is presently thought that properties are maximized at a molar ratio of the component having a functionality of 3 or 4 to the difunctional component (2) of of about 4:1 and a ratio of total hydroxyl and amine equivalents to mols of monohydric acrylate of about 2.4:1.

The oligomer of this invention is used in admixture with an ultraviolet curable liquid acrylate or polyacrylate to provide the liquidity needed for application and to adjust the hardness or softness of the cured coating for the selected single coat or topcoat utility. The invention includes the new oligomers with their branched extremities.

In the preferred coating compositions, the polyacrylate oligomer should constitute at least about 30% of the reactive components in the coating, preferably at least about 40%, and the polyacrylate oligomer will not exceed about 80% of the coating composition, preferably not more than 70%. The balance of the coating composition will be largely constituted by ultraviolet-curable liquids and appropriate photoinitiators, as will be discussed.

The properties needed for single coat application are a tensile modulus in the range of from about 2,000 to about 20,000, preferably from 5,000 to 15,000 and the capacity to resist microbending down to about −40° C. The properties needed in an ultraviolet-curable topcoating composition can be identified by reference to the testing of a 3 mil test film peeled from a glass support on which it was formed and cured by ultraviolet exposure. The film should possess a tensile strength of at least 2000 psi. in combination with a room temperature (25° C.) tensile modulus of at least 50,000 psi. to identify proper performance for topcoat application. Prior ultraviolet-cured coatings having this considerable strength lacked desired flexibility, evidenced by an elongation of less than 20%. The ultraviolet-cured films in this invention combine a tensile modulus in excess of 50,000 psi., usually over 100,000 psi., with an elongation measured at 25° C. of at least about 30%, usually at least 40%.

Previous efforts to provide appropriate topcoating compositions have been successful, but those compositions must include acrylic acid to have reasonable ultraviolet cure speed, and even then the cure speed obtained in this invention is better than the prior compositions containing acrylic acid.

The buffer coatings which may be overcoated will vary considerably, but these are characterized by a relatively low tensile modulus at room temperature. It is because the buffer coating on the optical glass fiber has a room temperature modulus below about 1000 psi, that overcoating becomes important.

Referring more particularly to the ultraviolet curable liquid acrylate or polyacrylate which provides the liquidity needed for application and to adjust the hardness or softness of the cured coating for the selected single coat or topcoat utility, these may be monoacrylates or polyacrylates, as desired. Both of these are well known to provide the viscosity needed for coating application, albeit some are better than others for providing desired curing speed and/or desired softness or hardness.

Thus, when hardness is desired, one will employ a proportion of a polyacrylate having a molecular weight below about 600, such as pentaerythritol triacrylate or trimethylol propane triacrylate. These will be used either alone or together with acrylate-functional monomers of high glass transition temperature, such as dimethyl acrylamide. On the other hand, when softness is desired, one will normally use a monoacrylate having a low glass transition temperature, several of which will be mentioned hereinafter. When high cure speed is desired together with softness, one may use a relatively high molecular weight liquid linear aliphatic diacrylate in which the two acrylate groups are separated by a linear chain containing at least 6 carbon atoms, or where less than 6 carbon atoms are present in the chain, that chain is a part of a polyether or similar oligomer having a molecular weight of from 400 to about 4000, preferably from 600 to 2500. These will be further described hereinafter.

The molecular weights of reactive materials is routinely calculated from the known formula and the measured reactivity, and this molecular weight designation will be used unless otherwise specified. This type of molecular weight designation is a number average molecular weight, and all molecular weights reported herein are of this character.

The use of low molecular weight liquid polyacrylates to harden ultraviolet curing coating compositions is well known, as has been illustrated.

Many acrylate-functional monomers of high glass transition temperature are known for inclusion in radiation-curable coating compositions. These are generally monomers having a glass transition temperature above about 55° C., and are further illustrated by N-vinyl pyrrolidone, vinyl caprolactam, isobornyl acrylate, acrylic acid and dicyclopentenyl acrylate. These all render the composition more fluid, which aids application. It is preferred not to use more than 45% of acrylate-functional monomer to avoid excessive fluidity. The N-vinyl pyrrolidone and vinyl caprolactam noted above are unusually reactive, closely resembling acrylate reactivity. Thus, despite their lack of an acrylate group, they are considered to be an equivalent of an acrylate-functional compound.

The most rapid curing of the above named monomers is acrylic acid, and it has an offensive odor, irritates skin and eyes, corrodes metals, and introduces water sensitivity. In this invention we obtain high cure speed in the absence of acrylic acid.

Acrylate-functional monomers having a low glass transition temperature, e.g., less than 0° C., preferably less than −20° C., provide flexibility for single coat or topcoat use. The glass transition temperature is measured on a homopolymer of the monomer. Low glass transition temperature acrylate monomers which may be used are ethoxyethoxyethyl acrylate, phenoxyethyl acrylate, dimethylaminoethyl acrylate, butoxyethyl acrylate, 2-hydroxyethyl acrylate, and tetrahydro furfuryl acrylate.

While acrylate-functionality is preferred in both the oligomers of this invention and also in the monoacrylate and polyacrylates which have been referred to above, it will be understood that where electron beam or similar ionizing radiation is used for cure, one can employ other monoethylenically unsaturated moieties, such as methacrylate functionality. Thus, the corresponding methacrylates, and even crotonates, are also useful in some aspects of this invention.

To illustrate liquid polyacrylates which may be used for single coat application, reference is made to liquid linear aliphatic diacrylates in which the two acrylate groups are separated by a molecular weight of at least 400 up to about 4000. The preferred diacrylates for single coat use have a molecular weight of from 600 to 2500 and the two acrylate groups are desirably separated by a polyoxybutylene structure. The preferred polyoxybutylene glycol diacrylates have a molecular weight of from 800 to 2000. Other liquid linear aliphatic diacrylates which may be used are 1,12-dodecyl diacrylate and the reaction product of 2 moles of acrylic acid with one mole of dimer fatty alcohol, these normally having 36 carbon atoms.

Commercially available liquid linear aliphatic diacrylates which may be used are Chemlink products 9000 and 9001 as well as 2000. The Chemlink products are available from the Sartomer Division of Arco, West Chester, Pa.).

The instant coating compositions normally cure to provide films which have an index of refraction above 1.48, and this is preferred for the single coating of optical glass fiber, and they also resist microbending down to around −40° C.

Referring more particularly to the polyacrylate-terminated oligomer which contains a plurality of urethane and/or urea groups and which is formed from the two polymers noted previously, these will have an average molecular weight of at least about 1400, preferably at least about 1700. The average molecular weight may be as high as about 30,000, but is preferably below about 20,000.

The hydroxyl or amine difunctional polymer will contain from 200 to 4000 units of weight, preferably from 400 to 3000 units of weight. These polymers are typically illustrated by polyoxyalkylene glycols and polyoxyalkylene diamines having molecular weights within the range specified. More particularly, one may employ herein a dihydric polyether or polyester, preferably containing alkylene groups having from 1 to 6 carbon atoms (preferably 3 or 4 carbon atoms) and a molecular weight as specified. These are illustrated by polyoxyethylene glycol having a molecular weight of 1000, 1500, 2000 or 2500, polyoxypropylene glycol of corresponding molecular weight, and polytetramethylene glycol of molecular weight 1000. Polyoxyethylated or polyoxypropylated diols, such as butane diol, hexane diol, polyoxyethylene glycol or polyoxypropylene glycol, are also useful.

Polyesters which may be used are illustrated by polycaprolactone glycols, such as the commercially available Tone 0240 from Union Carbide Corporation which is a polycaprolactone glycol having a molecular weight of about 2000.

Typical difunctional amine polymers which may be used instead of or in admixture with the dihydroxy polymers are amine-terminated polyethers, such as amine-terminated polyoxyethylene, or preferably amine-terminated polyoxypropylene, with the polyether chain providing the bulk of the needed molecular weight. These are specifically illustrated by polyoxypropylene diamine of molecular weight 200, 400 and 2000, and by polyoxyethylene diamine of molecular weight 600.

The hydroxyl or amine functional polymer having a functionality of 3 or 4, will also contain from 400 to 4000 units of weight. These are illustrated by polyoxyethylated or polyoxypropylated triols, and tetrols, these triols and tetrols being illustrated by glycerin, trimethylol propane and pentaerythritol. The corresponding amine-terminated polymers are also useful, and several of these are available from Texaco, Inc., Houston, Tex., and will be illustrated in the examples.

Triols and tetrols based on polycaprolactones are also available, and these as well as those containing a polyoxypropylated backbone are more hydrophobic and are preferred for some purposes.

As previously indicated the hydroxyl or amine polymers described above are bonded or coupled together with organic diisocyanate to provide the desired urethane and/or urea groups. The usual diisocyanates are illustrated by toluene diisocyanate and isophorone diisocyanate, and this class of compound is well known.

The polyacrylate-terminated oligomers of this invention can be made in various ways. Thus, the at least trifunctional polymer and the monohydric acrylate can be reacted with all the diisocyanate, thus producing a mixture primarily constituted by isocyanate-terminated trifunctional polymer most of the isocyanate groups of which have been reacted with monohydric acrylate. This reaction product is then reacted with the required amount of difunctional polymer to consume all of the isocyanate functionality.

To vary the above, one can preform the isocyanate-terminated trifunctional polymer and react it with the monohydric acrylate in a second stage, and then react in the difunctional polymer. Also, one can preform the isocyanate-terminated trifunctional polymer with the difunctional polymer and then react in the monohydric acrylate. One may also prereact the difunctional polymer with excess diisocyanate to form a diisocyanate and then react that with the at least trifunctional polymer to form an hydroxy or amine functional composite which is then reacted with preformed monohydric acrylate-diisocyanate adduct.

All of these procedures are viable, albeit the products they produce are slightly different from one another. With a little imagination, still other variations will likely be evident.

When single coat application is intended, one may elect to introduce desired softness into the polyacrylate-terminated oligomer by employing an organic diisocyanate in which a linear aliphatic chain containing at least 6 carbon atoms separates the two isocyanate groups.

The separation of the two isocyanate groups may include other groups in addition to the long carbon chain. Thus, dimer fatty acids may be reacted with ethylene oxide to provide hydroxy ester groups, or with several moles of ethylene oxide to add ether groups, and then the hydroxy-terminated product so-provided can be reacted with excess diisocyanate to provide isocyanate terminal groups. Also, the two carboxy groups in the starting dimer fatty acid can be converted to amine groups in known fashion, and the resulting diamine can be reacted with excess diisocyanate to provide a diisocyanate.

The diisocyanates referred to above are used in conventional fashion, the reaction with hydroxy functionality to form urethane groups, and the reaction with amine functionality to form urea groups both being conventional and illustrated herein in the examples. Of course, primary and secondary amines are both monofunctional with respect to isocyanate functionality.

The oligomers which are formed must be capped to join terminal acrylate groups to the hydroxy or amine-terminated branch ends. One way to accomplish the desired capping is by reacting with excess diisocyanate to form an isocyanate-terminated oligomer which is half end capped with a monohydric acrylate, such as a $C_2$ to $C_4$ hydroxyalkyl acrylate. Alternatively, the monohydric acrylate can first be reacted with one molar proportion of organic diisocyanate to provide a monoethylenic monoisocyanate which is then reacted with the hydroxy-functional oligomer described above.

Any monohydric acrylate may be used to end cap the isocyanate functional oligomers used herein, typically 2-hydroxyethyl acrylate. 2-hydroxypropyl acrylate and 2-hydroxybutyl acrylate are also useful. Trimethylol propane diacrylate or pentaerythritol triacrylate will further illustrate the class of useful monohydric alcohols, but here the large number of desired terminal acrylate groups is provided by the large number of hydroxyl or amine groups on the oligomer, so the monohydric monoacrylates are preferred.

While monohydric acrylates are primarily contemplated, as noted above, electron beam-curing compositions are also useful herein, in which case the monohydric acrylates can be replaced by the corresponding methacrylates, crotonates, and the like, as is well known. Thus, this invention broadly embraces the use of monohydric monoethylenically unsaturated compounds.

The coating compositions of this invention are intended to be cured with ultraviolet light, so photoinitiators are normally present in an amount of from 0.5% to 8%, preferably from 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propiophenone, thioxanthone, benzoin, benzil, anthraquinone, and the like. Benzophenone is quite effective in this invention, but it is presently preferred to use dimethoxyphenyl acetophenone which is available in commerce under the trade designation Irgacure 651 from Ciba-Geigy, Ardsley, N.Y. These photoinitiators may be used alone or in admixture with one another, and amines, like diethyl amine, can be added as photosensitizer, though this is not normally needed.

The ultraviolet-curing coating compositions of this invention are normally free of volatile organic solvents since these would have to be evaporated before ultraviolet exposure, which would slow the curing system. On the other hand, when electron beam curing is contemplated, the oligomers may be used in the absence of other unsaturated materials and applied from solvent solution, typically using a tetrahydrofuran solvent at 70% solids content.

To avoid any question, the terms "acrylate" and "polyacrylate" are used in their accepted sense of denoting an acrylic acid ester group.

Throughout this description and also in the claims, proportions are by weight unless otherwise stated. The invention is illustrated as follows.

EXAMPLE 1

|   | Reactants | Grams (equivalents) |
|---|---|---|
| A. | Polyoxypropylene glycol (molecular weight = 1000) | 59.5 (0.1241) |
| B. | 2-hydroxyethyl acrylate | 73.9 (0.6364) |
| C. | Isophorone diisocyanate | 162.8 (1.4648) |
| D. | amine-terminated polyoxypropylated trimethylol propane, mol. wt. = 440 | 104.3 (0.7043) |
| E | Dibutyltin dilaurate | 0.40 |
| F. | Phenothiazine | 0.11 |
| G. | Phenoxyethyl acrylate | 208.5 |

Jeffamine T403 supplied by Texaco, Houston, Tex., may be used to provide the amine-terminated polyoxypropylated trimethylol propane.

Procedure

The apparatus consists of a 1 liter 4-necked round bottom flask fitted with a stirrer, dry air sparge, 250 ml addition funnel, and a room temperature water bath with heating coil. Reactants C, E, and F were charged to the flask, and reactants B and A were added dropwise over a period of 1 hour with the temperature remaining between 25° and 35° C. After stirring at room temperature for 3 hours, reactant D dissolved in 133 grams of reactant G were added dropwise over a period of 2 hours to maintain a homogeneous solution. However, a rapid addition of 75.5 grams of additional G was needed to dilute the reactants after the first 20 minutes to prevent excessive viscosity. After the addition of D, the water bath was heated to 70° C., and when the reaction mixture reached 70° C., the NCO level was measured by infrared spectrometry and found to be zero.

Discussion

The oligomer formed as described above is a solution in phenoxyethyl acrylate containing about 34.2% phenoxyethyl acrylate. This solution has a viscosity measured using a #6 spindle at 1 rpm at 25° C. of 640,000 centipoises. The amount of hydroxyethyl acrylate used to form the oligomer is about 2.5 equivalents per mole of the triamine. When the amount of hydroxy ethyl acrylate is reduced, the branching increases and the polymer becomes harder and tougher. When the amount of hydroxyethyl acrylate is increased, the branching is reduced, and the attributes provided by the difunctional component is correspondingly reduced.

EXAMPLE 2

66.0 parts of the solution product of Example 1 is mixed with 11.0 parts of additional phenoxyethyl acrylate, 10.0 parts of the triester of trimethylol propane with beta-carboxyethyl acrylate having a molecular weight of about 500, 10.0 parts of vinyl caprolactam, and 3.0 parts of dimethoxyphenyl acetophenone. The product was a clear, straw-colored liquid having a viscosity of 7160 centipoises. On application to a glass surface and curing with 3.5 Joules per square centimeter of ultraviolet light to provide a cured film having a thickness of 3.0 mil which is removed from the glass and tested, it was found that the tensile strength was 3,800 psi, the elongation at room temperature was 42%, the tensile modulus at room temperature was 110,000 psi. These physical properties are the average of testing several repeats of this example. The cure speed was rapid, as indicated by the fact that methyl ethyl ketone extraction following cure with only 0.05 Joule per square centimeter removed only 9.7% of the weight of the film. In comparison, a full cure provided by 3.5 Joule per square centimeter removed only 2.9% of the weight of the film. This film is well adapted for topcoat application.

EXAMPLE 3

Example 2 is repeated except the triacrylate and the vinyl caprolactam are omitted, and additional phenoxyethyl acrylate is added to obtain a viscosity of 7160 centipoises. This composition cures to provide a softer and more flexible film which is well adapted to single coat application.

EXAMPLE 4

The Example 2 coating of this invention are applied to freshly drawn optical glass fiber having a diameter of about 125 microns and which had been buffer coated with a very soft buffer coating and cured with ultraviolet light in a thickness of about 125 microns. This buffer coated fiber was then topcoated with the coating composition of Example 2 in a thickness of about 125 microns and cured by passing the coated fiber through two tandemly arranged 10 inch 300 watts medium pressure mercury vapor lamps at 1.5 meters per second.

The topcoat was well cured and well adapted to protect the buffer coated optical fiber.

Correspondingly, the single coat composition of Example 3 can be applied directly to the freshly drawn optical glass fiber and cured in the same way to protect the optical fiber in a manner which resists low temperatures down to around $-40°$ C.

EXAMPLE 5

70 parts of the solution of Example 1 are dissolved in 30 parts of tetrahydrofuran and coated onto Mylar with a three mil applicator and allowed to dry to form a film about two mils thick. After electron beam curing the film had a tensile modulus over 200,000 psi. and an elongation in excess of 5%.

What is claimed is:

1. A radiation-curable oligomer having a plurality of ethylenically unsaturated terminal groups which contains a plurality of urethane and urea groups and which is formed from components which include: (1) amine functional polymer having a molecular weight of from about 300 to about 4000 and an amine functionality of 3 or 4, or a mixture thereof; (2) hydroxyl or amine functional polymer having a molecular weight of from about 200 to about 4000 and a functionality of two; (3) a monohydric monoethylenically unsaturated compound; and (4) organic diisocyanate in an amount sufficient to react with all of the reactive groups in components (1), (2) and (3), said monohydric monoethylenically unsaturated compound being used in an amount to react, via said diisocyanate, with all of the reactive groups on said component (1) less from 10% to 80% of the last reactive group thereon, said components (1) and (2) being present in a molar ratio of from 2:1 to 8:1, and said diisocyanate bonding said polymer components (1) and (2) to provide an oligomer having more than two amine terminated branches which are capped with said monohydric monoethylenically unsaturated compound via said diisocyanate to which said monohydric compound is bonded by a urethane group.

2. A radiation-curable oligomer as recited in claim 1 in which said monohydric monoethylenically unsaturated compound is a monohydric acrylate.

3. An ultraviolet curing liquid coating composition which, when cured with ultraviolet light in the presence of a photoinitiator, either provides a single coating for optical glass fiber having adequate strength at room or expected elevated temperature, and a low tensile modulus which remains low to resist microbending difficulties down to around $-40°$C., or which can be used to overcoat softer buffer coatings which remain soft to resist microbending difficulties down to around $-60°$ C., said coating composition consisting essentially of a polyacrylate-terminated oligomer which contains a plurality of urethane and urea groups and which is formed from components which include: (1) amine functional polymer having a molecular weight of from about 300 to about 4000 and an amine functionality of 3 or 4, or a mixture thereof; (2) hydroxyl or amine functional polymer having a molecular weight of from about 200 to about 4000 and a functionality of two; (3) a monohydric acrylate; and (4) organic diisocyanate in an amount sufficient to react with all of the reactive groups in components (1), (2) and (3), said monohydric acrylate being used in an amount to react, via said diisocyanate, with all of the reactive groups on said component (1) less from 10% to 80% of the last reactive group thereon, said components (1) and (2) being present in a molar ratio of from 2:1 to 8:1, said diisocyanate bonding said polymer components (1) and (2) to provide an oligomer having more than two amine terminated branches which are capped with said monohydric acrylate via said diisocyanate to which said monohydric compound is bonded by a urethane group, and said polyacrylate-terminated oligomer being in admixture with an ultraviolet curable liquid acrylate or polyacrylate to provide the liquidity needed for application and to adjust the hardness or softness of the cured coating for the selected single coat or topcoat utility.

4. A coating composition as recited in claim 3 in which each of said polymers have a molecular weight of at least about 400.

5. A coating composition as recited in claim 4 in which said polyacrylate-terminated oligomer has a molecular weight of at least about 1,400.

6. A coating composition as recited in claim 3 in which each of said polymers is a polyether having a molecular weight of from about 400 to 3000, and said polyacrylate-terminated oligomer has a molecular weight of at least about 1,700.

7. A coating composition as recited in claim 6 in which said amine functional polymer has a functionality of 3.

8. A coating composition as recited in claim 3 in which said polyacrylate-terminated oligomer constitutes at least about 30% up to about 80% of the reactive components in the coating.

9. A coating composition as recited in claim 3 in which said polyacrylate-terminated oligomer constitutes at least about 40% up to about 70% of the reactive components in the coating.

10. A coating composition as recited in claim 3 adapted for topcoat application in which said ultraviolet curable liquid comprises an acrylate-functional monomer having a glass transition temperature above about 55° C. in the absence of acrylic acid.

11. A coating composition as recited in claim 3 adapted for topcoat application in which said ultraviolet curable liquid comprises a polyacrylate having a molecular weight below about 600.

12. A coating composition as recited in claim 3 adapted for single coat application in which said ultraviolet curable liquid comprises an acrylate-functional monomer having a glass transition temperature less than 0° C.

13. A coating composition as recited in claim 3 adapted for single coat application in which said ultraviolet curable liquid comprises an acrylate-functional monomer having a glass transition temperature less than −20° C.

14. A coating composition as recited in claim 3 adapted for single coat application in which said ultraviolet curable liquid is a liquid linear aliphatic diacrylate in which the two acrylate groups are separated by at least a chain of 6 carbon atoms or by a molecular weight of at least 400 up to about 4000.

15. A coating composition as recited in claim 14 in which said two acrylate groups are separated by a molecular weight of from 600 to 2500.

16. A coating composition as recited in claim 14 in which said two acrylate groups are separated by a polyoxybutylene structure.

17. A coating composition as recited in claim 14 in which said linear liquid diacrylate is a polyoxybutylene glycol diacrylate having a molecular weight of from 800 to 2000.

18. A coating composition as recited in claim 3 in which said polyacrylate-terminated oligomer contains both urethane and urea groups and is made with a trifunctional amine polyoxypropylene polymer and a polyoxyalkylene glycol.

19. A coating composition as recited in claim 3 in which said acrylate-functional compound is 2-hydroxyethyl acrylate.

20. A coating composition as recited in claim 3 in which said monohydric acrylate is used in a deficiency of from 20% to 70%.

21. An optical glass fiber single coated with an ultraviolet-cured coating of the composition of claim 12.

22. An optical glass fiber topcoated with an ultraviolet-cured coating of the composition of claim 12.

23. An optical glass fiber topcoated with an ultraviolet-cured coating of the composition of claim 11.

24. A radiation-curable oligomer having a plurality of ethylenically unsaturated terminal groups which contains a plurality of urethane and urea groups and which is formed from components which include: (1) amine functional polymer having a molecular weight of from about 300 to about 4000 and an amine functionality of 3, or a mixture thereof; (2) hydroxyl or amine functional polymer having a molecular weight of from about 200 to about 4000 and a functionality of two; (3) a monohydric acrylate; and (4) organic diisocyanate in an amount sufficient to react with all of the reactive groups in components (1), (2) and (3), said monohydric monoacrylate being used in an amount to react, via said diisocyanate, with all of the reactive groups on said component (1) less from 10% to 80% of the last reactive group thereon to provide a molar ratio of said component having a functionality of 3 to said difunctional component (2) of from 2:1 to 8:1 and a ratio of total hydroxyl and amine equivalents to mols of monohydric acrylate of from 3:1 to 1:1, and said diisocyanate bonding said polymer components (1) and (2) to provide an oligomer having more than two amine terminated branches which are capped with said monohydric acrylate via said diisocyanate to which said monohydric compound is bonded by a urethane group.

25. A radiation-curable oligomer as recited in claim 24 in which said molar ratio of said component having a functionality of 3 to said difunctional component (2) is from 2.5:1 to 6:1 and said ratio of total hydroxyl and amine equivalents to mols of monohydric acrylate is from 2.8:1 to 2.0:1.

26. A radiation-curable oligomer as recited in claim 25 in which said molar ratio of said component having a functionality of 3 to said difunctional component (2) is about 4:1 and said ratio of total hydroxyl and amine equivalents to mols of monohydric acrylate is about 2.4:1.

27. A radiation-curable oligomer as recited in claim 26 in which said components (2) and (3) are based on a polycaprolactone or a polyoxypropylene backbone.

28. An ultraviolet curing liquid coating composition which, when cured with ultraviolet light in the presence of a photoinitiator, either provides a single coating for optical glass fiber having adequate strength at room or expected elevated temperature, and alow tensile modulus which remains low to resist microbending difficulties down to around −40° C., or which can be used to overcoat softer buffer coatings which remain soft to resist microbending difficulties down to around −60° C., said coating composition consisting essentially of a polyacrylate-terminated oligomer which contains a plurality of urethane and urea groups comprising the radiation-curable oligomer of claim 24 in admixture with an ultraviolet curable liquid acrylate or polyacrylate to provide the liquidity needed for application and to adjust the hardness or softness of the cured coating for the selected single coat or topcoat utility.

* * * * *